United States Patent
Moribayashi

(10) Patent No.: US 7,925,748 B2
(45) Date of Patent: Apr. 12, 2011

(54) SYSTEM AND METHOD FOR MANAGING SYSTEM RESOURCES IN A NETWORK ENVIRONMENT

(75) Inventor: Akira Moribayashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/257,483

(22) Filed: Oct. 24, 2008

(65) Prior Publication Data

US 2010/0106818 A1 Apr. 29, 2010

(51) Int. Cl.
*G06F 15/173* (2006.01)
(52) U.S. Cl. .................. 709/224; 709/226; 709/223
(58) Field of Classification Search .......... 709/223–224, 709/226–228, 232; 370/352
See application file for complete search history.

(56) References Cited

U.S. PATENT DOCUMENTS

| | | | | |
|---|---|---|---|---|
| 6,321,264 | B1* | 11/2001 | Fletcher et al. | 709/224 |
| 6,754,657 | B2* | 6/2004 | Lomet | 1/1 |
| 7,133,911 | B1* | 11/2006 | Schaffer et al. | 709/224 |
| 7,747,729 | B2* | 6/2010 | Levy et al. | 709/224 |
| 2006/0074970 | A1* | 4/2006 | Narayanan et al. | 707/102 |
| 2007/0214261 | A1* | 9/2007 | Kikuchi et al. | 709/224 |
| 2007/0294388 | A1* | 12/2007 | Yu | 709/224 |
| 2008/0144624 | A1* | 6/2008 | Marcondes et al. | 370/392 |
| 2009/0210528 | A1* | 8/2009 | Swildens et al. | 709/224 |
| 2009/0232159 | A1* | 9/2009 | Haran et al. | 370/468 |

FOREIGN PATENT DOCUMENTS

| | | |
|---|---|---|
| JP | 2001-117897 | 4/2001 |
| JP | 2006-211360 | 8/2006 |

OTHER PUBLICATIONS

Moribayashi, Akira. U.S. Appl. No. 12/325,326. Title: "System and Method for Managing System Resources in a Network Environment". Filed Dec. 1, 2008. Group Art Unit: Unknown. Confirmation No. 1288.

Office Action (Mail Date Jul. 22, 2010) for U.S. Appl. No. 12/325,326, filed Dec. 1. 2008, Confirmation No. 1288.

* cited by examiner

*Primary Examiner* — Salad Abdullahi
(74) *Attorney, Agent, or Firm* — Schmeiser, Olsen & Watts; John Pivnichny

(57) ABSTRACT

A method for managing system resources in a network environment. The method begins by reading from a first log timestamp $T_i$ for $i=1, 2, \ldots, I$, where each $T_i$ comprises a timestamp corresponding to a unique request to utilize system resources. After reading timestamps, calculating estimated response $E_i$ for $i=1, 2, \ldots, I$, according to a function. After calculating estimated responses, the method continues by calculating actual response $R_i$ for $i=1, 2, \ldots, I$, according to a function $R_i = E_i - T_i$. After calculating all actual responses; storing each actual response in a second log. The second log comprising both timestamp $T_i$ and actual response $R_i$ for $i=1, 2, \ldots, I$.

20 Claims, 5 Drawing Sheets

SYSTEM AND METHOD FOR MANAGING SYSTEM RESOURCES IN A NETWORK ENVIRONMENT

BACKGROUND OF THE INVENTION

The present invention relates generally to deriving network response time, and more particularly to identifying network congestion by deriving network response time processing generic HTTP request logs.

Conventionally, mission critical systems based on HTTP such have become common infrastructures. Recently, peer-to-peer (P2P) networks have become popular and useful for effectively exchanging mass data. However, business transactions primarily rely on client/server networks as the means to distribute data.

One endemic problem for distribution systems using client/server topology is that it is difficult to quantify the system's resource requirements during normal operation. As a result, quantitative variations in resource requirements are not identified and/or recognized, the result of which is that it may not be possible to quickly narrow down and identify the root cause of resource fluctuations and implement appropriate countermeasures.

SUMMARY OF THE INVENTION

The present invention provides a method for managing system resources in a network environment, said method comprising:

reading from a first log timestamp $T_i$ for i=1, 2, ..., I, each said $T_i$ comprising a timestamp corresponding to a unique request to utilize said system resources, said I corresponding to the total number of timestamps residing in said first log, said index I being a positive integer having a value greater than 1;

after said reading, calculating estimated response $E_i$ for i=1, 2, ..., I, according to a function $E_i=\max(T_x|1<x<i)$;

calculating actual response $R_i$ for i=1, 2, ..., I, according to a function $R_i=E_i-T_i$, wherein if said $R_i$ is equal to a negative number then $R_i$ is changed to being equal to 0; and storing actual response $R_i$ for I=1, 2, ..., I, in a second log, said second log comprising both timestamp $T_i$ and actual response $R_i$ for i=1, 2, ..., I.

DETAILED DESCRIPTION OF THE DRAWINGS

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
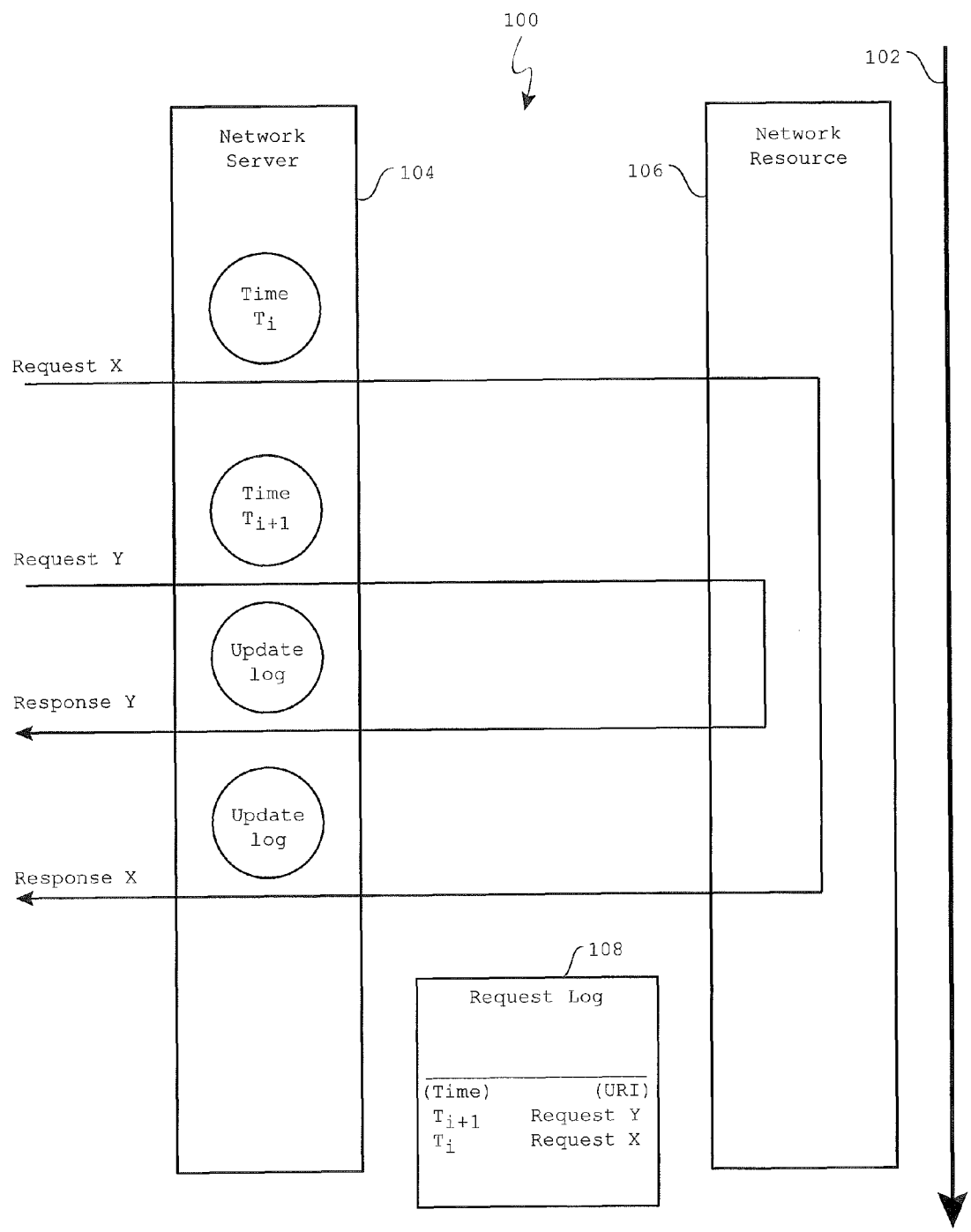
FIG. 1 illustrates the contextual relationship between network resource requests and a request log, in accordance with embodiments of the present invention.

FIG. 1 illustrates the contextual relationship 100 between network resource requests and a request log 108, in accordance with embodiments of the present invention.

The contextual relationship 100 comprises a network server 104, a network resource 106, and a hypertext transfer protocol (HTTP) request log 108. The line 102 denotes the direction in which time travels.

The network server 104 takes note of the time ($T_i$) as the Request X is received. Request X continues past the network server 104 and accesses the network resource 106. Location of the network resource 106 is not relevant to the present invention; rather the present invention focuses on the elapsed time between a request (i.e. Request X) for the network resource and a response to the request (i.e. Response X).

As time 102 progresses, Response X, being responsive to Request X, is sent from the network resource 106 through the network server 104 back to the requesting party. As Response X passes back through the network server 104, the network server 104 updates the request log 108. The request log 108 comprises the time (e.g. $T_i$, $T_{i+1}$, etc.) for each request (e.g. Request X, Request Y, etc.) in the order in which each response was sent.

In the example illustrated with respect to FIG. 1, during the period of time between Request X and Response X, Request Y was received by the network server 104. The network server 104 notes the time ($T_{i+1}$) Request Y is received and routes said Request Y to the network resource 106. The amount of time required to respond to Request Y being shorter than the time 102 required to respond to Request X, Response Y passes back through the network server 104 before Response X. When the network server 104 receives Response Y, the network server 104 updates the request log 108. Thus, in the response log 108 Request Y appears before Request X. Therefore, it is understood that the request log 108 comprises a list of request times sorted in order by their respective response time.

Figure 2A:
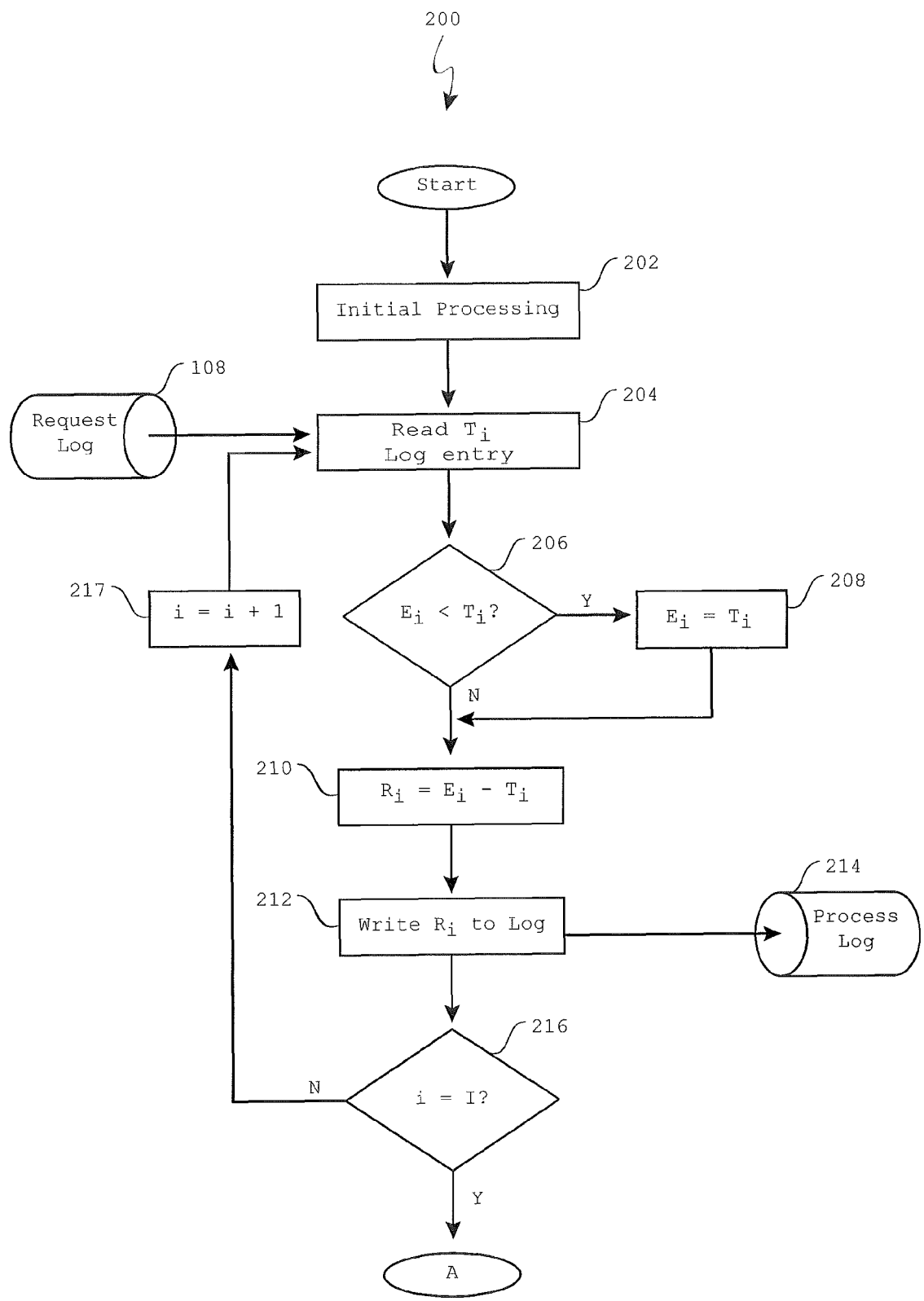
FIG. 2A and FIG. 2B (collectively referred to as FIG. 2) illustrates a method for managing system resources in a network environment, in accordance with embodiments of the present invention.
Figure 2B:
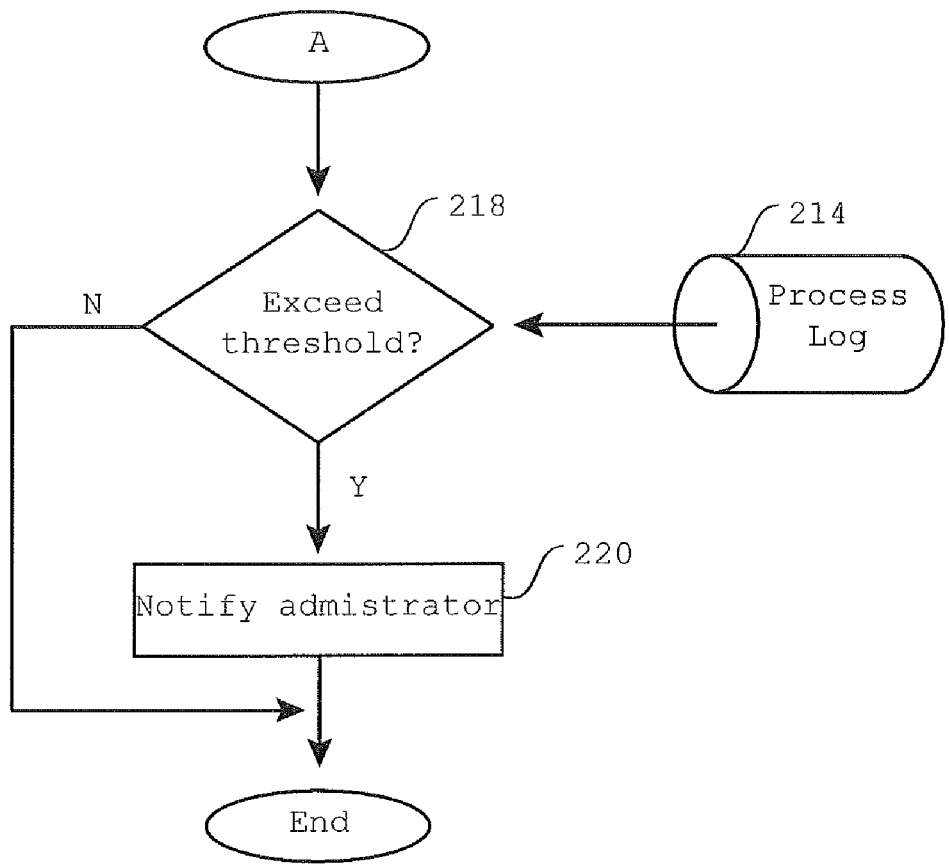

FIG. 2A and FIG. 2B (collectively referred to as FIG. 2) illustrates a method 200 for managing system resources in a network environment, in accordance with embodiments of the present invention. The method 200 begins with step 202 in which the initial processing is conducted.

Step 202 comprises initial processing HTTP requests and responses in the network environment. The network server 104 conducts the initial processing: timestamping requests and updating a request log after responding to said requests (see FIG. 1, supra). After completion of step 202, the method 200 continues with step 204 which comprises reading the request log 108.

In an alternative embodiment of the present invention, the initial processing 202 is performed outside the method 200 for managing system resources in a network environment. The alternative embodiment of method 200 would therefore begin with step 204 which comprises reading entry $T_i$ in the request log 108.

Step 204 comprises reading entry $T_i$ from the request log 108. The request log 108 comprises a list of request times sorted in order by their respective response time. Therefore, the request log 108 can be viewed as a list of timestamps $T_i$, indexed from i=1 to i=I, where I is a positive number greater than 1. The index i has an initial value of 1 so during the first iteration of step 204 the first request log 108 entry is read.

After completion of step 204, the method 200 continues with step 206 which determines whether $E_i$ is less than $T_i$.

Step 206 comprises determining whether $E_i$ is less than $T_i$. The variable $E_i$ represents the estimated response time for the $i^{th}$ request log 108 entry. When a request is processed and a response is sent the estimated time, $E_i$, is represented as the function $E_i = \max(\{T_x | 1 < x < i\})$. For example, take the following sample request log 108 entries:

| i | Entry in Request Log ($T_i$) |
|---|---|
| 1 | 2008/08/29 10:00:05 GET/snoop HTTP/1.1 |
| 2 | 2008/08/29 10:00:00 POST/execute/put HTTP/1.1 |
| 3 | 2008/08/29 10:00:01 POST/execute/put HTTP/1.1 |
| 4 | 2008/08/29 10:00:03 POST/execute/call HTTP/1.1 |
| 5 | 2008/08/29 10:00:06 GET/snoop HTTP/1.1 |
| 6 | 2008/08/29 10:00:07 GET/snoop HTTP/1.1 |

Specifically, looking at the entry where i=3, $E_i$ is calculated as the maximum between $T_1$ and $T_2$. Since $T_1$=10:00:05 where $T_2$=10:00:00, it is clear that $E_i$=10:00:05 where i=3.

After calculating $E_i$ according to the function $E_i = \max(\{T_x | 1 < x < i\})$, step 206 determines whether $E_i$ is less than $T_i$. If $E_i$ is less than $T_i$, then the method 200 continues with step 208 which comprises setting the value of $E_i$ to that of $T_i$. However, if $E_i$ is equal to or greater than $T_i$, the method 200 continues with step 210 which comprises calculating R.

Step 208 comprises setting the value for $E_i$ to that of $T_i$. Step 208 is performed only when $E_i$ is less than $T_i$, pursuant to step 206. Looking at the request log 108 entries provided supra, when i=5, $T_i$=10:00:06 but $E_i$=10:00:05. Therefore, since $E_i$ is less than $T_i$, step 208 is performed where $E_i$ therein has the value of $T_i$, or 10:00:06. After completion of step 208, the method 200 continues with step 210 which comprises calculating the value for $R_i$.

Step 210 comprises calculating the value of $R_i$. The variable $R_i$ represents the response time for the $i^{th}$ request log 108 entry. $R_i$ is represented as the function $R_i = E_i - T_i$. After completion of step 210, the method 200 continues with step 212 which writes $R_i$ to a process log 214.

Step 212 comprises writing the value of $R_i$ to the process log 214. It is understood that the process log 214 comprises a list of response times. An example of the process log 214 may be:

| i | Request ($T_i$) | Response ($R_i$) |
|---|---|---|
| 1 | 2008/08/29 10:00:05 GET/snoop HTTP/1.1 | 0 |
| 2 | 2008/08/29 10:00:00 POST/execute/put HTTP/1.1 | 5 |
| 3 | 2008/08/29 10:00:01 POST/execute/put HTTP/1.1 | 4 |
| 4 | 2008/08/29 10:00:03 POST/execute/call HTTP/1.1 | 2 |
| 5 | 2008/08/29 10:00:06 GET/snoop HTTP/1.1 | 0 |
| 6 | 2008/08/29 10:00:07 GET/snoop HTTP/1.1 | 0 |

After completion of step 212, the method 200 continues with step 216 which comprises determining whether the entire request log 108 was been processed.

Step 216 comprises determining whether the entire request log 108 has been processed. Note, the request log 108 is viewed as a list of timestamps $T_i$, indexed from i=1 to i=I, where I is a positive number greater than 1. Step 216 determines whether index i is equal to the total number (I) of entries in the request log 108. If index i is equal to the total number I, then the method 200 continues with step 218 which comprises determining whether any value within the process log 214 exceeds a threshold. However, if index i is not equal to the total number I, then the method 200 continues by increases index i by one (i.e. i=i+1) in step 217 and looping back to step 204 to perform steps 204 through 216 for the updated i.

Step 218 comprising determining whether any entry in the process log 214 exceeds a threshold. Step 218 receives the process log 214 as input prior to making the determination. The threshold is a positive value greater than 1 and provided by an administrator prior to making the determination. Note, it is understood that the process log 214 comprises a list of response times $R_i$ for index i=1 to I. If any value of $R_i$ for i=1 to I is greater than the threshold provided by the administrator, the method 200 continues with step 220 which comprises notifying the administrator. However, if no value of $R_i$ for i=1 to I is greater than the threshold provided by the administrator, the method 200 ends.

Step 220 comprises notifying the administrator if any value of $R_i$ for i=1 to I is greater than the threshold. The notification sent to the administrator by means of an output device (see FIG. 4, infra). After completion of step 220, the method 200 ends.

Figure 3:
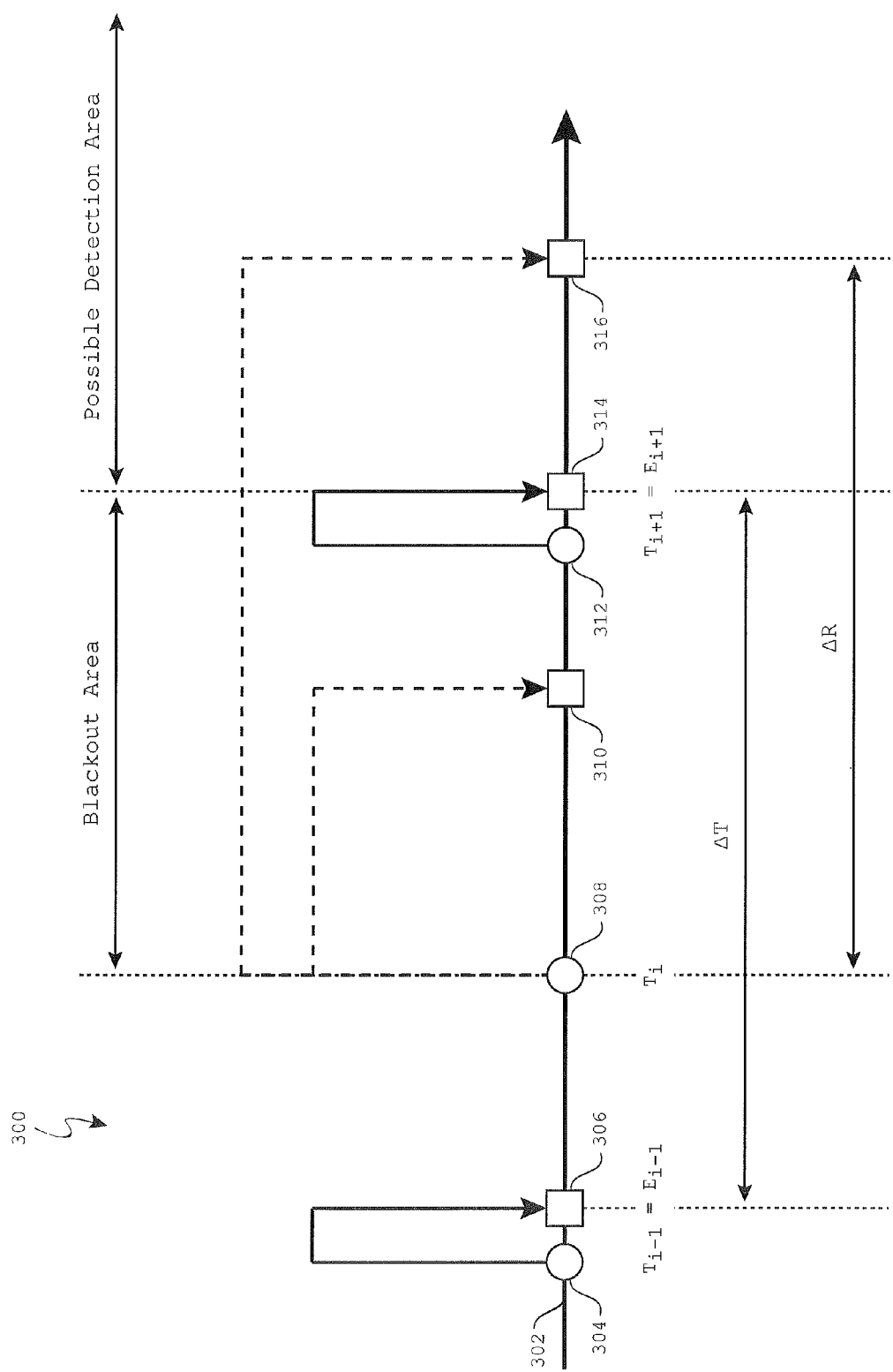
FIG. 3 illustrates the detection accuracy of the method for managing system resources in a network environment, in accordance with embodiments of the present invention.

FIG. 3 illustrates the detection accuracy 300 of the method 200 for managing system resources in a network environment, in accordance with embodiments of the present invention.

The line 302 represents the direction in which time runs. Request X 304 immediately produces Response X 306, therefore the $T_{i-1} = E_{i-1}$ for Response X 306, which results in a response time of $R_{i-1}=0$. Similarly, Request Z 312 immediately produces Response Z 314, therefore the $T_{i+1} = E_{i+1}$ for Response Z 314, which results in a response time of $R_{i+1}=0$. The distance, measured in time, between Response X 306 and Response Z 314 is called ΔT.

Ideally, the present invention seeks to minimize ΔT to the smallest possible time allowed for by the network environment. Conventionally, HTTP requests are captured and stored in a request log every one (1) second. Therefore, in a conventional network environment ΔT would have a length of one second. However, if the shorted amount of time between HTTP request captures is greater than one second, the present invention may supply artificial data to the network server 104 (see FIG. 1, supra) in order to minimize the length of time for ΔT. Request Y 308 occurs at time $T_i$. There are two possible locations for Response Y: 1) at 310 which is before Request Z 312; or 2) at 316 which is after Response Z. The distance, measured in time, between Request Y 308 and Response Y 310/316 is called ΔR.

Since ΔT is the smallest amount of time the network server 104 can capture requests and responses, if Response Y occurs at 310, both Request Y 308 and Response Y 310 would occur between a single ΔT. The present invention would not detect Response Y 310 and therefore would not recognize that Request Y 308 was provided Response Y 310. However, if Response Y occurs at 316, the Request 308 and Response 316 fall within different ΔT periods and the present invention will detect and accurately record Response Y 316. Therefore, the present invention seeks to minimize ΔT so that ΔT is smaller than ΔR. If ΔT is sufficiently small then each ΔR will be detected and accurately recorded.

Figure 4:
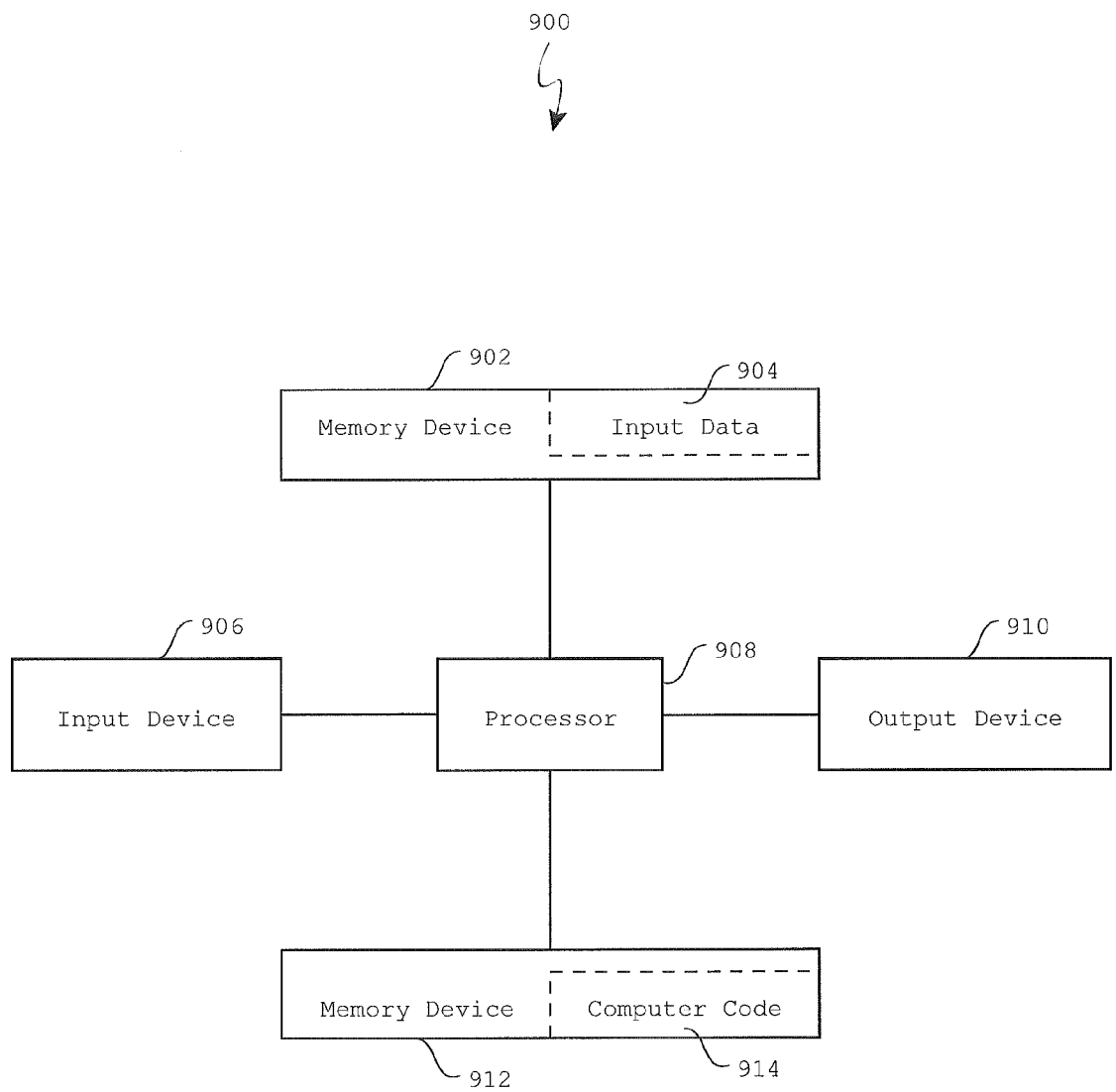
FIG. 4 illustrates a computer system which may facilitate a method for managing system resources in a network environment, in accordance with embodiments of the present invention.

FIG. 4 illustrates a computer system 900 which may facilitate a method for managing system resources in a network environment, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for managing system resources in a network environment according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for managing system resources in a network environment. Thus, the present invention discloses a process for supporting computer infrastructure, comprising integrating, hosting, maintaining and deploying computer-readable code into a computing system (e.g., computing system 900), wherein the code in combination with the computing system is capable of performing a method for managing system resources in a network environment.

In another embodiment, the invention provides a business method that performs the process steps of the invention on a subscription, advertising and/or fee basis. That is, a service provider, such as a Solution Integrator, can offer to create, maintain, support, etc. a process for managing system resources in a network environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing system resources in a network environment, said method comprising:

reading from a first log timestamp $T_i$ for i=1, 2, ..., I, each said $T_i$ comprising a timestamp corresponding to a unique request to utilize said system resources, said I corresponding to the total number of timestamps residing in said first log, said index I being a positive integer having a value greater than 1;

after said reading, calculating estimated response $E_i$ for i=1, 2, ..., I, according to a function $E_i=\max(T_x|1<x<i)$;

calculating actual response $R_i$ for i=1, 2, ..., I, according to a function $R_i=E_i-T_i$, wherein if said $R_i$ is equal to a negative number then $R_i$ is changed to being equal to 0; and storing actual response $R_i$ for I=1, 2, ..., I, in a second log, said second log comprising both timestamp $T_i$ and actual response $R_i$ for i=1, 2, ..., I.

2. The method of claim 1, said method further comprising:

comparing a threshold value to each said actual response $R_i$ for i=1, 2, ..., I, said threshold value being a positive integer having a value greater than 1; and sending a message to an output device if said comparing determines that at least one said actual response $R_i$ has a value greater than said threshold value.

3. The method of claim 2, wherein said threshold value is both provided by an administrator and received prior to said comparing.

4. The method of claim 2, said message further comprising:

each of said at least one actual response $R_i$ determined to have a value greater than said threshold value; and each timestamp $T_i$ corresponding to each said at least one actual response $R_i$ determined to have a value greater than said threshold value.

5. The method of claim 1, wherein prior to said reading from said first log:

monitoring a network server for at least one said request to utilize said system resources;

monitoring said network server for at least one response, each response of said at least one response corresponding to a unique request of said at least one said request;

in response to having identified said at least one said request, recording a timestamp T corresponding to the time in which said at least one said request was identified; and in response to having identified said at least one said response, storing said timestamp T in said first log.

6. A computer program product, comprising a computer readable storage device having a computer-readable program code stored therein, said computer-readable program code containing instructions that when executed by a processor of a computer system implement a method for managing system resources in a network environment, said method comprising:

reading from a first log timestamp $T_i$ for i=1, 2, ..., I, each said $T_i$ comprising a timestamp corresponding to a unique request to utilize said system resources, said I corresponding to the total number of timestamps residing in said first log, said index I being a positive integer having a value greater than 1;

after said reading, calculating estimated response $E_i$ for i=1, 2, ..., I, according to a function $E_i$=max $(T_x | 1 < x < i)$;

calculating actual response $R_i$ for i=1, 2, ..., I, according to a function $R_i = E_i - T_i$, wherein if said $R_i$ is equal to a negative number then $R_i$ is changed to being equal to 0; and storing actual response $R_i$ for I=1, 2, ..., I, in a second log, said second log comprising both timestamp $T_i$ and actual response $R_i$ for i=1, 2, ..., I.

7. The computer program product of claim 6, said method further comprising:

comparing a threshold value to each said actual response $R_i$ for i=1, 2, ..., I, said threshold value being a positive integer having a value greater than 1; and sending a message to an output device if said comparing determines that at least one said actual response $R_i$ has a value greater than said threshold value.

8. The computer program product of claim 7, wherein said threshold value is both provided by an administrator and received prior to said comparing.

9. The computer program product of claim 7, said message further comprising:

each of said at least one actual response $R_i$ determined to have a value greater than said threshold value; and each timestamp $T_i$ corresponding to each said at least one actual response $R_i$ determined to have a value greater than said threshold value.

10. The computer program product of claim 6, wherein prior to said reading from said first log:

monitoring a network server for at least one said request to utilize said system resources;

monitoring said network server for at least one response, each response of said at least one response corresponding to a unique request of said at least one said request;

in response to having identified said at least one said request, recording a timestamp T corresponding to the time in which said at least one said request was identified; and in response to having identified said at least one said response, storing said timestamp T in said first log.

11. A computing system comprising a processor coupled to a computer-readable memory unit, said memory unit comprising a software application, said software application comprising instruction that when executed by said processor, implement a method for managing system resources in a network environment, said method comprising:

reading from a first log timestamp $T_i$ for i=1, 2, ..., I, each said $T_i$ comprising a timestamp corresponding to a unique request to utilize said system resources, said I corresponding to the total number of timestamps residing in said first log, said index I being a positive integer having a value greater than 1;

after said reading, calculating estimated response $E_i$ for i=1, 2, ..., I, according to a function $E_i$=max $(T_x | 1 < x < i)$;

calculating actual response $R_i$ for i=1, 2, ..., I, according to a function $R_i = E_i - T_i$, wherein if said $R_i$ is equal to a negative number then $R_i$ is changed to being equal to 0; and storing actual response $R_i$ for I=1, 2, ..., I, in a second log, said second log comprising both timestamp $T_i$ and actual response $R_i$ for i=1, 2, ..., I.

12. The computing system of claim 11, said method further comprising:

comparing a threshold value to each said actual response $R_i$ for i=1, 2, ..., I, said threshold value being a positive integer having a value greater than 1; and sending a message to an output device if said comparing determines that at least one said actual response $R_i$ has a value greater than said threshold value.

13. The computing system of claim 12, wherein said threshold value is both provided by an administrator and received prior to said comparing.

14. The computing system of claim 12, said message further comprising:

each of said at least one actual response $R_i$ determined to have a value greater than said threshold value; and each timestamp $T_i$ corresponding to each said at least one actual response $R_i$ determined to have a value greater than said threshold value.

15. The computing system of claim 11, wherein prior to said reading from said first log:

monitoring a network server for at least one said request to utilize said system resources;

monitoring said network server for at least one response, each response of said at least one response corresponding to a unique request of said at least one said request;

in response to having identified said at least one said request, recording a timestamp T corresponding to the time in which said at least one said request was identified; and in response to having identified said at least one said response, storing said timestamp T in said first log.

16. A process for supporting computer infrastructure, said process comprising providing at least one support service for at least one of creating, integrating, hosting, maintaining, and deploying computer-readable code in a computing system, wherein said code in combination with the computing system is capable of implementing a method for managing system resources in a network environment, said method comprising:

reading from a first log timestamp $T_i$ for i=1, 2, ..., I, each said $T_i$ comprising a timestamp corresponding to a unique request to utilize said system resources, said I corresponding to the total number of timestamps residing in said first log, said index I being a positive integer having a value greater than 1;

after said reading, calculating estimated response $E_i$ for i=1, 2, ..., I, according to a function $E_i$=max $(T_x | 1 < x < i)$;

calculating actual response $R_i$ for i=1, 2, ..., I, according to a function $R_i = E_i - T_i$, wherein if said $R_i$ is equal to a negative number then $R_i$ is changed to being equal to 0; and storing actual response $R_i$ for I=1, 2, ..., I, in a second log, said second log comprising both timestamp $T_i$ and actual response $R_i$ for i=1, 2, ..., I.

17. The process for supporting computer infrastructure of claim 16, said method further comprising:

comparing a threshold value to each said actual response $R_i$ for i=1, 2, ..., I, said threshold value being a positive integer having a value greater than 1; and sending a message to an output device if said comparing determines that at least one said actual response $R_i$ has a value greater than said threshold value.

18. The process for supporting computer infrastructure of claim 17, wherein said threshold value is both provided by an administrator and received prior to said comparing.

19. The process for supporting computer infrastructure of claim 17, said message further comprising:
    each of said at least one actual response $R_i$ determined to have a value greater than said threshold value; and
    each timestamp $T_i$ corresponding to each said at least one actual response $R_i$ determined to have a value greater than said threshold value.

20. The process for supporting computer infrastructure of claim 16, wherein prior to said reading from said first log:
    monitoring a network server for at least one said request to utilize said system resources;
    monitoring said network server for at least one response, each response of said at least one response corresponding to a unique request of said at least one said request;
    in response to having identified said at least one said request, recording a timestamp T corresponding to the time in which said at least one said request was identified; and
    in response to having identified said at least one said response, storing said timestamp T in said first log.

* * * * *